United States Patent [19]

Taylor

[11] Patent Number: 4,992,933
[45] Date of Patent: Feb. 12, 1991

[54] SIMD ARRAY PROCESSOR WITH GLOBAL INSTRUCTION CONTROL AND REPROGRAMMABLE INSTRUCTION DECODERS

[75] Inventor: James L. Taylor, Eastleigh, United Kingdom

[73] Assignee: International Business Machines Corporation, Armonk, N.Y.

[21] Appl. No.: 519,332

[22] Filed: May 4, 1990

Related U.S. Application Data

[63] Continuation of Ser. No. 250,595, Sep. 27, 1988, abandoned.

[30] Foreign Application Priority Data

Oct. 27, 1986 [GB] United Kingdom ............... 8725116

[51] Int. Cl.$^5$ ..................... G06F 15/16; G06F 9/30
[52] U.S. Cl. .................... 364/200; 364/231.9; 364/261; 364/261.1; 364/259.9; 364/259
[58] Field of Search ... 364/200 MS File, 900 MS File

[56] References Cited

U.S. PATENT DOCUMENTS

| | | | |
|---|---|---|---|
| 4,783,738 | 11/1988 | Li et al. | 364/200 |
| 4,825,359 | 4/1989 | Ohkami et al. | 364/200 |
| 4,922,418 | 5/1990 | Dolecek | 364/200 |

FOREIGN PATENT DOCUMENTS

| | | |
|---|---|---|
| 0208457 | 1/1987 | European Pat. Off. . |
| 0223690 | 5/1987 | European Pat. Off. . |
| WO86/07174 | 12/1986 | PCT Int'l Appl. . |
| WO87/01485 | 3/1987 | PCT Int'l Appl. . |
| 2177526 | 1/1987 | United Kingdom . |

OTHER PUBLICATIONS

Alexander, Peter, "Array Processors", Digital Design, Dec. 1978, pp. 104-107.

*Primary Examiner*—Gareth D. Shaw
*Assistant Examiner*—Kevin A. Kriess
*Attorney, Agent, or Firm*—Michael J. Scheer; John D. Crane; Robert L. Troike

[57] ABSTRACT

A single-instruction-multiple-data (SIMD) array processor is described with a multi-dimensional array of processing elements and control logic for issuing global instructions to the array. Each processing element in the array has individually programmable instruction decoder and a mechanism which enables efficiently programming and reprogramming of the instruction decoder. The present invention teaches a mechanism where the processing elements may be simultaneously updated in response to a global load instruction.

10 Claims, 10 Drawing Sheets

SIMD ARRAY PROCESSOR WITH GLOBAL INSTRUCTION CONTROL AND REPROGRAMMABLE INSTRUCTION DECODERS

This is a continuation of application Ser. No. 07/250,595, filed Sept. 27, 1988, now abandoned.

The present invention relates to a single-instruction-multiple-data (SIMD) array processor comprising a multidimensional array of interconnected processors.

BACKGROUND OF THE INVENTION

There are essentially two types of array processors—MIMD (multiple-instruction-multiple-data) and SIMD (single-instruction-multiple-data). In a MIMD array processor each of the processing elements in the array executes its own unique instruction stream with its own data. This contrasts with an array processor of the type to which the present invention is directed, that is a SIMD array processor, in that the individual processing elements operate instead under the control of a common instruction stream, this means that a SIMD machine is less flexible and can execute a more limited range of functions in parallel than a MIMD machine. However, the parallel processing elements of a SIMD machine are typically simpler and more numerous than in a MIMD processor.

Many SIMD array processors consist of a two-dimensional array of processing elements, each processing element being connected to its nearest neighbors to form a so-called NEWS (North, East, West, South) network. Examples of array processors of this type are the ICL Distributed Array Processor (DAP), and the "Connection Machine" which are described in "Parallel Computers" by Hockney & Jesshope, Adam Hilger Ltd. 1981, pp. 182–184 and "The Connection Machine" by W. Daniel Hillis, MIT Press 1986, pp. 74–76 respectively. UK -A-1445714 is also illustrative of a prior art SIMD array processor.

An example of the lack of flexibility if a SIMD machine arranged as a NEWS network can be seen with regard to a shift instruction. In a conventional NEWS network all processing elements will receive data from their neighbor one place away in a given direction e.g. South. The direction of shift for each processing element in a conventional NEWS network is globally and uniformly determined as a parameter of a global machine instruction being executed with the result that all processing elements shift data in the same direction. A typical instruction would be to shift the data three places North. The only exception to this known from the prior art is that some machines are able to selectively enable the processing elements in the NEWS network using a mask function so that the processing elements which have been enabled receive the global instructions. Also, in European Patent Application EP-A-208.457 a processor array is described on which each processing element in the array is able to select the element from which it takes its input.

The object of the present invention is to provide a SIMD array processor comprising a multi-dimensional array of processing elements which has an enhanced degree of flexibility to enable the potential for parallel processing to be better exploited without resorting to the expense and complexity of a MIMD processor.

SUMMARY OF THE INVENTION

In accordance with the present invention there is provided a SIMD array processor comprising a multidimensional array of processing elements and control logic for issuing global instructions to said arrays, in which a processing element includes programmable decoding means for the individual decoding for execution by that processing element of a global instruction, the programmable decoding means of respective processing elements are programmable in response to a global load instruction from the control logic.

In a particular embodiment of a SIMD array processor in accordance with the invention, which embodiment is to be described hereinafter, the programmable decoding means comprises programmable modifying means for locally modifying selected bits of the global instruction to form locally modified bits and fixed decoding means for decoding bits of the global instruction as received and said locally modified bits.

In that particular embodiment, the processing elements in the array are each associated with storage for control information and decoding means in a processing element causes modification information to be loaded from selected locations in said storage into the programmable modifying means of that processing element, whereby the programmable modifying means of respective processing elements may be programmed. Moreover, the processing elements in that embodiment are each associated with a corresponding block of said storage for control information and data and means are provided for the control logic to access said storage for storing appropriate modification information for the programmable decoding means in corresponding locations in each said block of storage.

In the particular embodiment to be described hereinafter the programmable modifying means comprises a look-up table having a serial write port for receiving said modification information serially from storage and a parallel read port for receiving said selected bits of a global instruction in parallel.

Also, in the particular SIMD array processor to be described hereinafter the programmable decoding means are adapted to be programmed to locally modify a global shift instruction, whereby data distributed throughout the array may be shifted at one time in a plurality of locally determined directions within the array. The processing elements in this processor are interconnected in a plurality of orthogonal directions. Each processing element comprises a plurality of output registers and a multi-way input multiplexer such that multiple simultaneous shift operations can be performed in each of a plurality of orthogonal directions by a processing element.

The extra freedom for control of a SIMD array processor in accordance with the present invention gives rise to a family of algorithms which it has not been possible to perform in parallel on prior SIMD array processors. Some of these are described later. A SIMD array processor in accordance with the present invention is particularly suitable for image processing applications and accordingly it may be implemented as part of a display system.

BRIEF DESCRIPTION OF THE DRAWINGS

There follows a description of a specific embodiment of the present invention with reference to the accompanying drawings in which.

DESCRIPTION OF PREFERRED EMBODIMENTS

Figure 1:
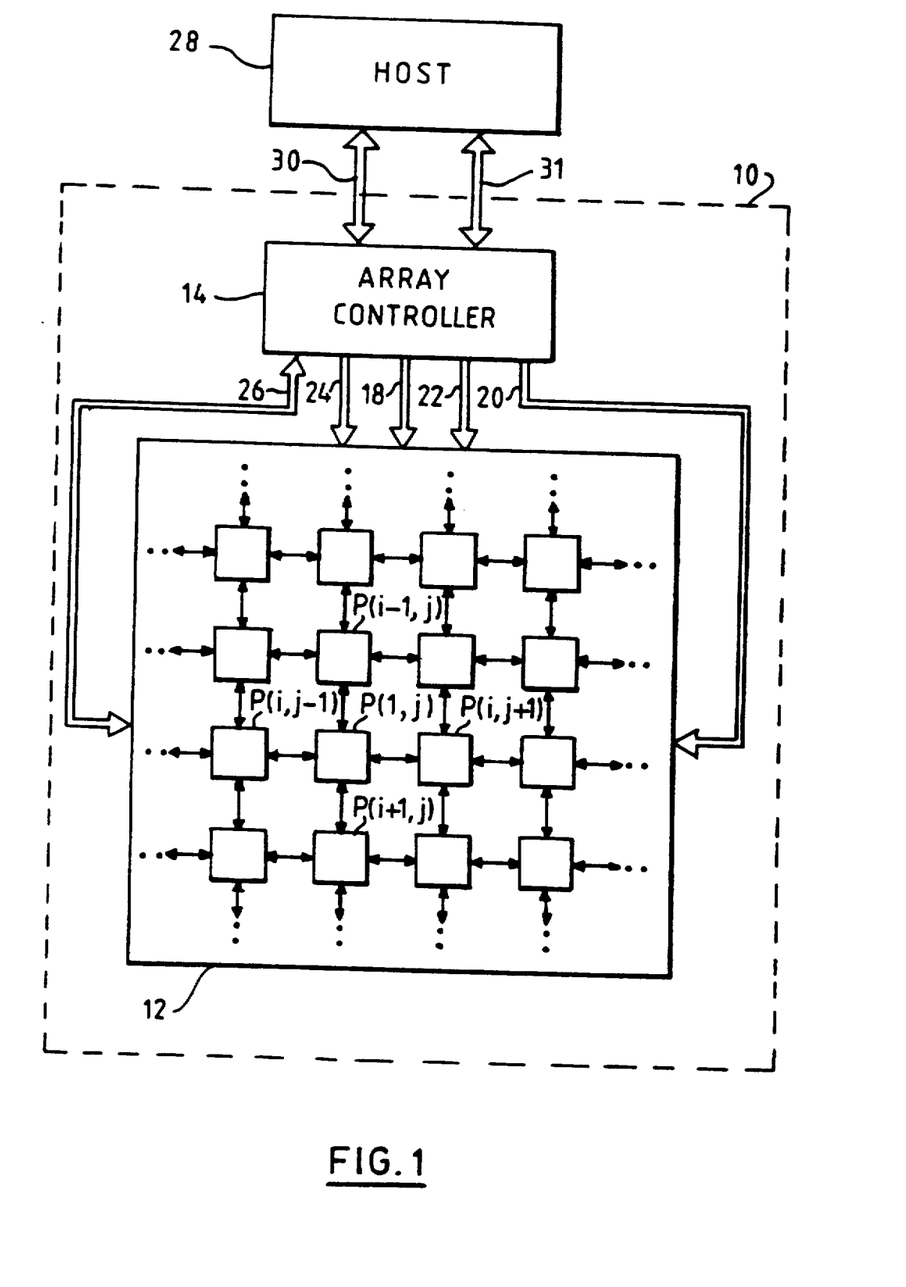
FIG. 1 is a schematic block diagram illustrating the overall structure of a typical SIMD array processor.

FIG. 1 illustrates a typical structure for a SIMD array processor 10. The processor 10 comprises an array 12 of processing elements P(i,j), and an array controller 14 for issuing a stream of global instructions to the processing elements P(i,j). Each of the processing elements operates on a single bit at any one time and has associated therewith a block of storage (not shown). The processing elements are connected by a so-called NEWS (North, East, West, South) network to their respective neighbors by bidirectional bit lines. Thus processing element P(i,j) is connected to the processing elements $P(i-1, j)$, $P(i,j+1)$, $P(i,j-1)$ and $P(i+1,j)$ in the Northern, Eastern, Western and Southern directions respectively. The NEWS network is also connected toroidally at its edges so that the Northern and Southern edges are bidirectionally interconnected and the Western and Eastern edges are similarly interconnected. In order that data may be input to and output from the array of processors, a controller-array data bus 26 is connected to the NEWS network. As shown it is connected to the East-West boundary of the array. It could equally be connected instead, or additionally, to the North-South boundary, or indeed to each processing element. It is connected to the East-West boundary by means of bidirectional tristate drivers which are connected to the toroidal East-West NEWS connections. It will be apparent to the skilled person that this is only one of the many possible means of connection of the data bus 26.

The number of processing elements in the array can be chosen as required. A typical number, as is used in a specific embodiment of the present invention to be described later, is $32 \times 32 = 1024$ individual processing elements. For ease of illustration however, only 16 individual processing elements are shown. Also, for reasons of ease of illustration, only the principle connections which are necessary for an understanding of the operation of the processor are indicated in FIG. 1. In FIG. 1, as in the remainder of the Figures, a double line connecting functional elements is used to represent a plurality of connection lines or a bus, a single line indicates a single bit line. The lines may be uni- or bidirectional as appropriate as indicated by the arrows in the Figures.

The array controller issues instructions in parallel to the processing elements via an instruction bus 18 and issues row select and column select signals via row select lines 20 and column select lines 22, respectively. These instructions cause the processing elements to load data from storage, to process the data and then to store the data once more in storage.

Each processing element has access to a bit slice of main memory. Logically therefore, the main memory of the array processor is separated into 1024 slices for a 1024 processing element array. This means that up to thirty-two 32-bit words can be transferred in or out of storage at one time. To perform a read or write operation, the memory is addressed in terms of an index address which is supplied to the memory address lines via an address bus 24 and a read or write instruction is supplied to each of the processing elements in parallel. During a read operation, the row and column select signals on the row and column select lines identify which of the processing elements are to perform the operation. Thus it is possible, for example to read a single 32-bit word from memory into the thirty-two processing elements in a selected row.

A host processor 28 is also shown in FIG. 1. This processor is used to load microcode programs into the array controller 14, to exchange data with it and to monitor its status via a host-controller data bus 30 and an address and control bus 31. The host processor can be any suitable general purpose computer such as a mainframe computer or a personal computer that includes a display device. No further description to the host processor is necessary.

The structure as described above is typical for prior art SIMD array processors. A processor of this type is described in UK-A-1 445 714.

In the following, a specific embodiment of a SIMD array processor in accordance with the present invention, which also has the overall structure shown in FIG. 1, will be described. It will be apparent from the following, however, that the present invention is not limited to the structure illustrated in FIG. 1. For example, the array of processors could be organized on a 3-D, 4-D (using clusters), etc. basis rather than on a 2-D basis. Also, instead of being configured as an item separate from a host processor, a SIMD array processor in accordance with the present invention may form an integral part of, for example, a display system such as a workstation with a display adapter. As will be clear from examples of algorithms which are described hereinafter, a SIMD array processor in accordance with the present invention is particularly suitable for image processing applications.

Figure 2:
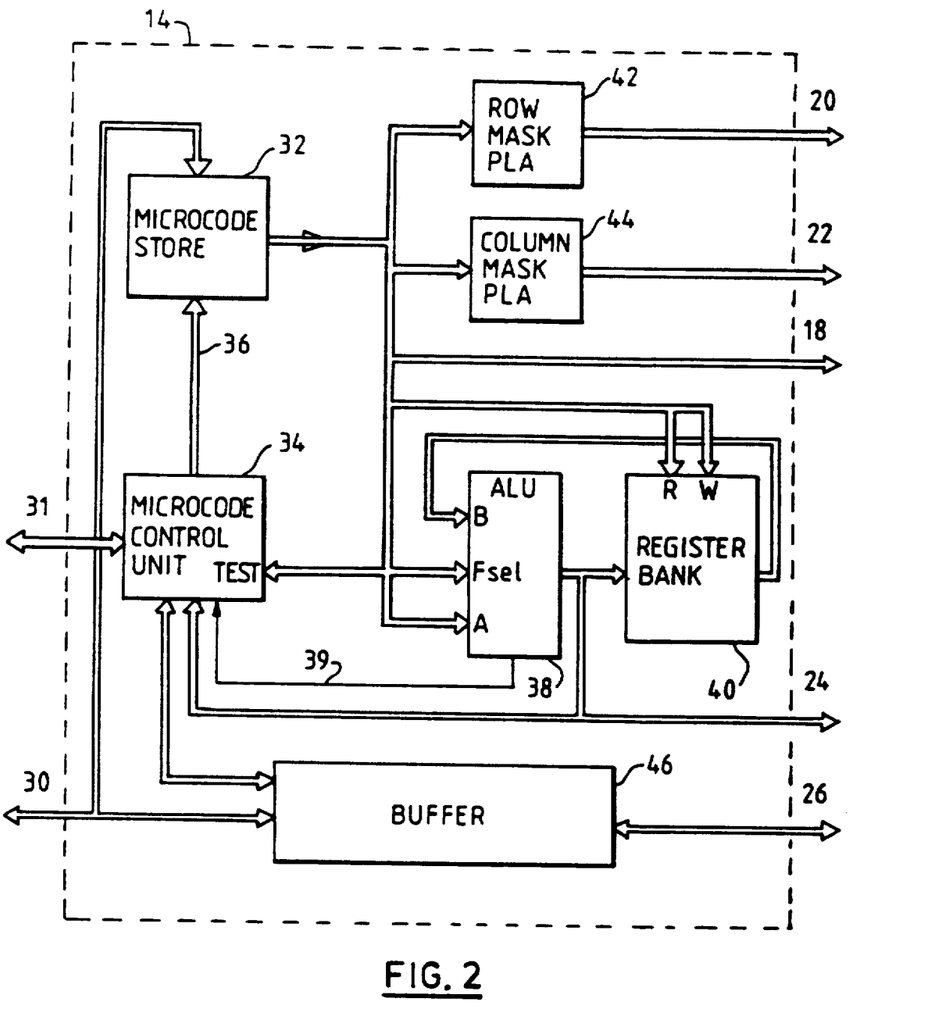
FIG. 2 is a schematic block diagram illustrating the principle components of the array controller of an embodiment of a SIMD array processor in accordance with the present invention.

FIG. 2 illustrates how the array controller shown in FIG. 1 is structured in the specific embodiment of a SIMD array processor in accordance with the present invention. Neither the detailed structure of the array controller shown in FIG. 2, nor specific details of its operation are essential to the present invention. Consequently, the structure and operation of the controller will only be briefly described in the following.

The array controller 14 comprises a microcode store 32 into which microcode defining the processing to be performed by the array processor is loaded by the host 28 using the data bus 30 and the address and control bus 31. Once the operation of the array controller 14 has been initiated by the host 28, the sequencing of the microcode is controlled by the microcode control unit 34 which is connected to the microcode store by bus 36. An ALU 38 and register bank 40 are used in the generation of array memory addresses, loop counting, jump address calculation and miscellaneous general purpose register operations which are output on the address bus 24. A flag line 39 is provided for conditional branching. A row mask PLA (Programmed Logic Array) 42 and a column mask PLA 44 are used for decoding row and column mask codes in a microinstruction being executed to generate signals on individual row select lines 20 and column select lines 22. Operation codes forming the instructions to the processing elements P(i,j) are fed onto the instruction bus 18. A data buffer 46 is shown between the host-controller data bus 30 and the controller-array data bus 26. This allows data from the host which is to be written into the array of processors to be rapidly down-loaded into the array controller 14. The data can then be loaded, under control of the microcode, into the array of processors. Similarly, the buffer can be used for transferring data between the array and the host. For this purpose the buffer is arranged as a bidirectional FIFO buffer under control of the microcode control unit.

Figure 3:
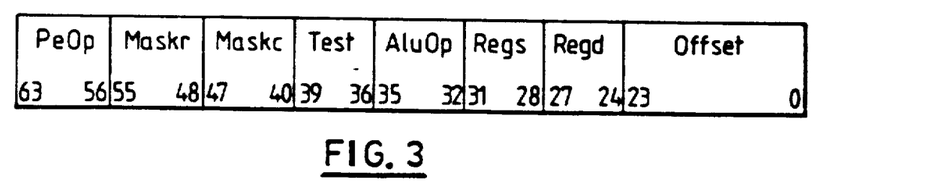
FIG. 3 illustrates the instruction format used in the array controller of FIG. 2.

The instruction format used in the specific embodiment of the present invention is illustrated in FIG. 3. It should be noted that the format shown in FIG. 3 is merely that used in the specific example of a SIMD array processor described herein. In other embodiments of the invention another format might well be used depending on the form of the controller for the processor array, the complexity of the individual processing elements and so on as will be apparent from the following description to one more skilled in the art.

The fields of the instruction which relate to the control of the processor array are the processing element operation code "PeOp", bits 63 to 56, the row mask code "Maskr", bits 55 to 48, and the column mask code "Maskc", bits 47 to 40. The "PeOp" field forms the operation code, or instruction, which is issued globally in parallel to processing elements in the array. The purpose of the row and column masks is to enable the instruction specified by the "PeOp" code to be executed by selected processing elements only. This enables memory read operations, inter-processor element shifts and intra-processor element register operations to be performed by selected processing elements only. The contents of the "Maskr" and "Maskc" fields are decoded by the row mask PLA 42 and the column mask PLA 44, respectively, for setting appropriate individual row select lines 20 and column select lines 22.

The further fields shown in FIG. 3 are all concerned with the sequencing of the array controller and array memory address generation in a conventional manner. The "Test" field, bits 39 to 36, defines the instruction flow within the array controller and is fed to "test" input of the microcode control unit, so that jumps, etc. are possible. The field "Aluop", bits 35 to 32, defines the general operation of the controller ALU 38 and is fed to its Fsel input. The fields "Regs", bits 31 to 28, and "Regd", bits 27 to 24, are used for selecting source and destination registers in the controller's register bank 40 and are fed for this purpose to R and W control inputs, respectively, of the register bank.

The field "Offset", bits 23 to 0, defines an argument for ALU operation and array memory address generation and is fed to the input A of the ALU 38.

Figure 4:
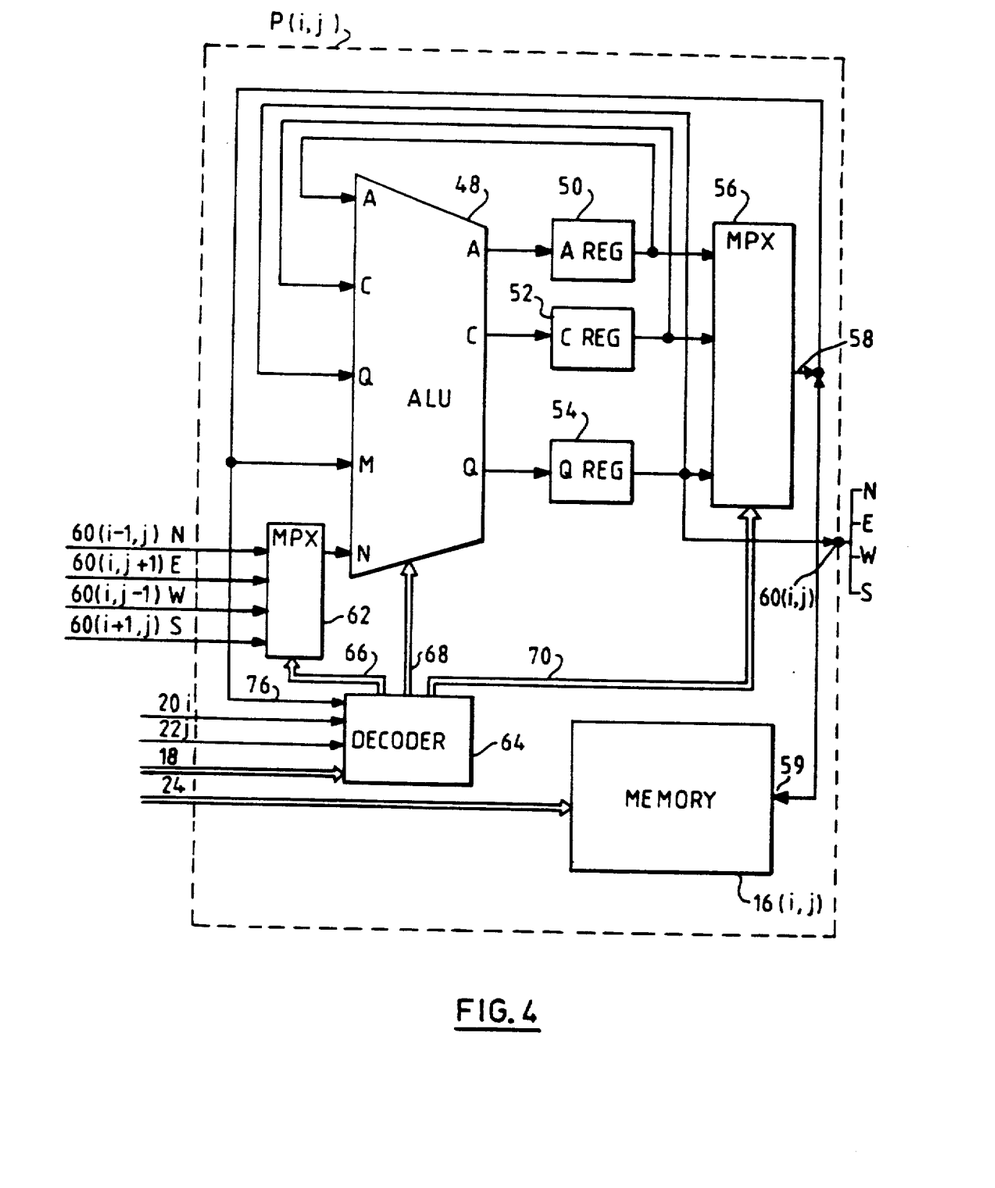
FIG. 4 is a schematic block diagram illustrating the principle components of an individual processing element from the processor array of an embodiment of the present invention.

FIG. 4 illustrates the principle components of one of the individual processing elements P(i,j) from the processor array 12. It should be understood that each processing element operates on a single bit of data at a time.

The processing element comprises an ALU 48, which in the specific example of a processing element shown, comprises inputs labelled A, C, Q, M, and N and outputs A, C and Q. The outputs A, C, and Q are connected to an A, or result register 50, a C, or carry register 52, and a Q, or NEWS output register 54, each of which is able to store a single bit of information. The outputs of these registers are connected back to the corresponding A, C and Q inputs to the ALU and also to a multiplexer 56. The multiplexer 56 enables the output of a selectable one of the A, C and Q registers to be passed to its output 58. The output 58 of the multiplexer 56 is connected to the M input of the ALU and also to bidirectional data port 59 of the slice of memory 16 (i,j) associated with the processing element P(i,j).

Each processing element is associated with a slice, or block, of memory 16(i,j) one bit wide. Although this slice or block memory is logically included within the processing element it may in fact be physically separate therefrom. As each of the processing elements has a similar block of memory, the 32×32 blocks of memory of the array can be thought of as an array memory, comprising a plurality of planes, each of which comprises thirty-two 32-bit words. Each plane comprises a bit from each of the processing elements at a corresponding index address. By supplying a single index address to the array memory via the address bus 24, one of the planes of bits can be accessed.

The output of the Q register also forms the NEWS output 60(i,j) of the processing element P(i,j) which is connected to the adjacent processing elements in the North (P(i−1,j)), East (P(i,j+1)), West (P(i,j−1)) and South (P(i+1,j)) directions. Data to be shifted into the processing element P(i,j) from an adjacent element in the NEWS network is selected by means of an input multiplexer 62 which is connected to the NEWS outputs 60 (i−1,j), 60(i,j+1), 60(i,j−1) and 60(i+1,j) of the adjacent processing elements in the North, East, West and South directions respectively. The output of the input multiplexer 62 is connected to the N input of the ALU 48.

The operation of the processing element is controlled by instructions, or operation codes, received from an array controller 14 over the instruction bus 18. The operation codes "PeOp" from the array controller are received in parallel on the instruction bus 18 from the array controller at the decoder 64 in each of the processing elements. As in prior art SIMD array processors, the status of the row and column select lines 20i and 22j for the processing element in question will determine whether the instruction is performed by that processing element or not. The decoder in each processing element is connected to the column and row select lines appropriate for the position of the processing element in the array. For the processing element P(i,j) on the ith row and the jth column this will be the ith row select line 20i and jth column select line 22j. When both the row and column select lines to a particular decoder 64 are selected, the decoder will decode the received operation code and thereby cause the processor to carry out the specified instruction by issuing control signals over control buses 66, 68 and 70 to the input multiplexer 62, the ALU 48 and the output multiplexer 56.

Two basic types of operation are performed in the ALU 48. The first type of operation is a routine operation in which a bit of input data is simply passed from the input of the ALU to the output. For example, a bit of data can be passed from a selected one of the NEWS inputs to the multiplexer 62 via that input multiplexer 62, the input N of the ALU and the Q output of the ALU to the Q register 54 which forms the NEWS output register. From there the information is output onto the NEWS network. Similarly a bit of data can be routed from a location in memory 16 specified by an address on the memory address bus 24 via the bidirectional data port 59 of the memory, the M input and the Q output of the ALU to the Q register. A second basic type of operation is an arithmetic one. In the processing element shown, the result register 50 and the carry register 52 are used principally for such operations. The actual operations which can be performed by the ALU 20 will depend on the internal structure of the unit. This will not be described in detail as it is not essential to an understanding of the present invention. Typically the ALU is implemented in a conventional manner as will be evident to one skilled in the art.

In prior art SIMD array processors the decoder as been hard-wired, usually in the form of a plurality of hard-wired logic gates. The decoder in a SIMD array processor in accordance with the present invention is, in contrast, programmable. In a particular embodiment of the invention, the decoder is programmable by the provision of a look-up table which operates as an instruction modifier. Further, in this embodiment of the invention, only selected bits of the operation code input to the decoder 64 are modified by the look-up table.

Figure 5:
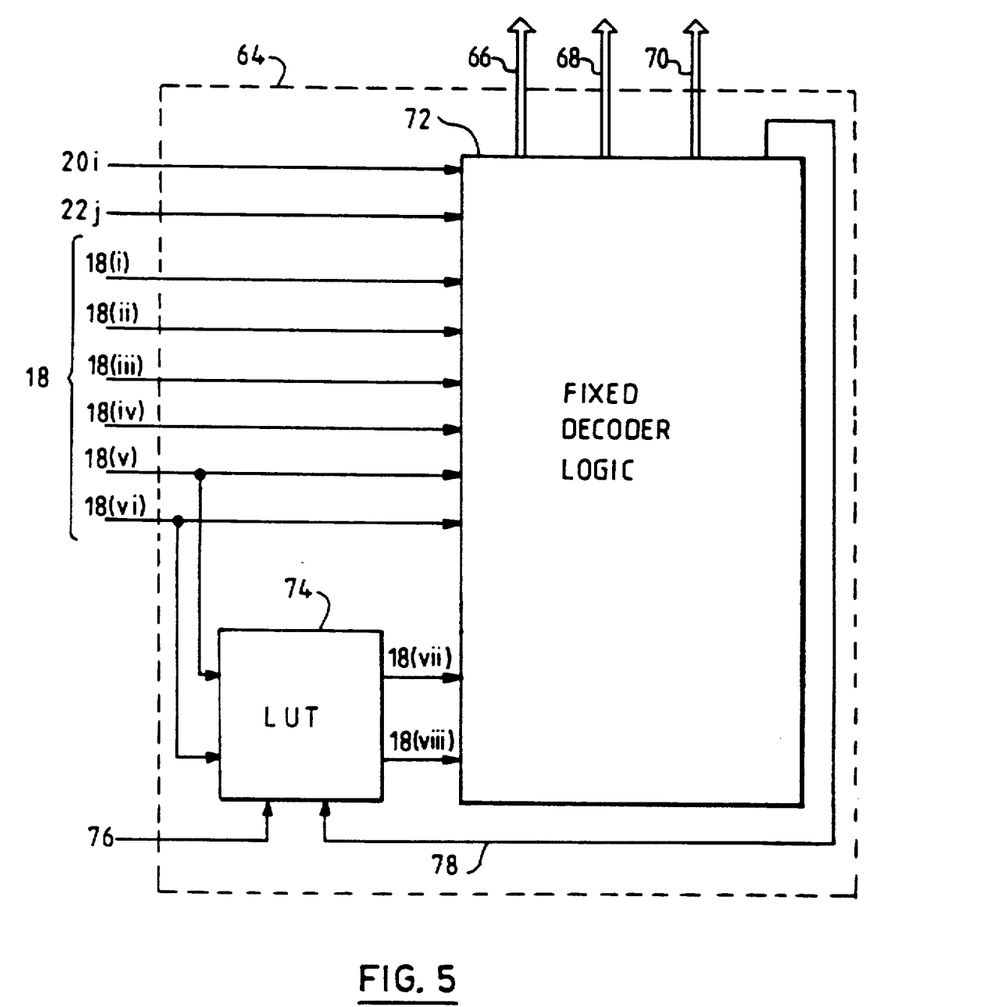
FIG. 5 is a schematic block diagram illustrating, in more detail, the decoder in the processing element of FIG. 4.

FIG. 5 illustrates the decoder 64 of this specific embodiment of the present invention in more detail. It comprises a first part 72 in the form of conventional fixed decoder logic such as hard-wired gates and a second, programmable part in the form of a look-up table (LUT) 74. The bits of the operation code on lines 18(i) to 18(vi) and the row and column select lines are input directly to the PLA as usual, but two of the bits 18(v) and 18(vi) of the operation code are also used to address the look-up table in parallel. The two-bit output of the look-up table location accessed by these bits forms modified operation bit lines 18(vii) and 18(viii) which are also input to the fixed decoder logic 72. The fixed decoder logic 72 logically combines the input data on lines 18(i)–(viii) to form the output control information on the control buses 66, 68 and 70.

The look-up table shown in FIG. 5 comprises four words of two bits each. These eight bits of data are loaded in series over a data line 76 from memory 16(i,j) (see also FIG. 4) in response to global "load look-up table" instruction from the array controller. As the look-up tables of the processing elements will contain indeterminate information before being initialized, the "load look-up table" instruction only uses unmodified bits 18(i) to (vi) of the operation code as received, that is the bits that do not go through the look-up table. The decoder in each of the processing elements produces the control signals on the buses 66, 68, 70 and on the control line 78 internal to the decoder when this instruction is received irrespective of the value of the lines 18(v) and 18(vi). The control line 78 is write enable line for the look-up table. Appropriate control, or modification, data for the look-up table of each of the respective processing elements would have been previously loaded via the data bus 26 and the Q register 54 into corresponding locations in the slice of memory 16(i,j) associated with each processing element P(i,j) so that the control data may be accessed and read into the look-up tables of each of the processing elements using global instructions and memory addresses. The storing of the control information is carried out by operating the array in a prior art manner using global unmodified instructions.

In a SIMD array processor according to the present invention there are essentially two sorts of global instructions defined by the "PeOp" operation codes. These are global instructions which cannot be modified locally and global instructions which can be modified locally. The first sort are global instructions which are used for initially loading data into the processor array, for shifting the data through the array for storing that data in the array memory and for subsequently loading modification data into the look-up tables. All other instructions can, in principle be modified locally, but they can only be used when appropriate modification information has been loaded into the look-up tables. The fixed decoder logic 72 logically combines the input data on lines 18(i) to 18(vi) (i.e. the unmodified instruction bits) in such a manner that it recognizes whether the instruction being decoded is locally modifiable and whether the input data on lines 18(vii) and 18(viii) (i.e. the modified instruction bits) are to be used to determine the operation actually performed by the processing element.

In the present example of a SIMD array processor in accordance with the present invention, the programmable decoder is used to specify a different shift direction for different processing elements despite the restriction of the global instructions. The actual direction in which data is shifted is the result of the selection of one of the NEWS inputs to the input multiplexer 62. Given that two bits of the instruction code (e.g. the bits 18(v) and 18(vii)) are used to specify the global direction of shift in the NEWS network, a look-up table for local modification of those two bits means that it is possible to individually specify a local direction of shift in each processing element in response to a given global shift instruction.

The preparation of the SIMD array processor shown for performing an algorithm which exploits the local modification of shift instructions can be summarized as follows.

Successive 32-bit words of data are read into the Western edge of the array of processors via the bidirectional tri-state drivers in the toroidal East-West NEWS connections and are shifted across the array using global unmodified shift East instructions. When the first word of data has migrated across the array of processors, respective bits of the first thirty-two words of data are written into corresponding memory locations in the blocks of memory associated with each processing element using a global unmodified write instruction. These steps are repeated until all the necessary information has been loaded into memory. During or after the above sequence, modification data is read into the look-up tables of the processing elements using a global unmodified "load look-up table" instruction. Once this step has been performed, the array of processors can be used to perform algorithms using locally modifiable instructions.

As mentioned above, a SIMD array processor in accordance with the present invention is particularly suitable for image processing applications. In order to expedite the input of image data to, and the output of image data from the array of processors, a high bandwidth data bus could additionally be connected to the processor array of a SIMD array processor in accordance with the present invention. Data could be input to the array from a video camera or video store and output to a video store or video display device via such a high bandwidth bus instead of over the controller-array data bus 26. The high bandwidth data bus is not, however, essential to the present invention.

Two algorithms will now be described which are of particular application in image processing and exploit the flexibility of an embodiment of a SIMD array processor in accordance with the present invention with the example of a programmable decoder unit shown in FIG. 5.

The first algorithm takes data held in the processor array and rotates it by 90 degrees. For a four by four array of bits the matrix of data before and after rotation would look as indicated below:

| BEFORE | | | | AFTER | | | |
|---|---|---|---|---|---|---|---|
| 1 | 2 | 3 | 4 | 4 | 8 | 12 | 16 |
| 5 | 6 | 7 | 8 | 3 | 7 | 11 | 15 |
| 9 | 10 | 11 | 12 → | 2 | 6 | 10 | 14 |
| 13 | 14 | 15 | 16 | 1 | 5 | 9 | 13 |

Figure 6:
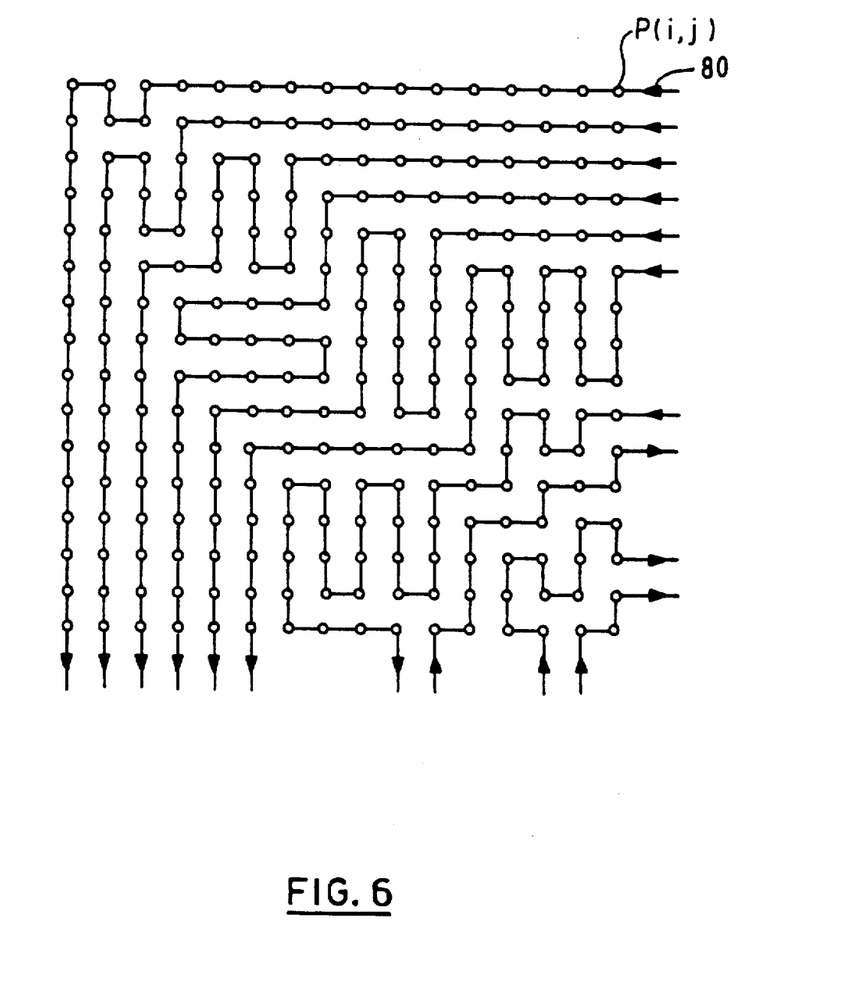
FIG. 6 is a diagram illustrating an algorithm which can be implemented on a SIMD array processor in accordance with the present invention.

The algorithm essentially comprises a series of shift operations which allow data to be moved around the array of processing elements on one of a set of closed, non-overlapping "paths", or "loops" such that, starting at any processing element, exactly M steps along the path leads to the correct processing element for the mapping. The North West quadrant of one possible way of setting out the set of loops for a 32 by 32 processor array is illustrated in FIG. 6. The remaining quadrants can be inferred by rotational symmetry.

It will be noticed that some loops are shorter than others and some have a clockwise and some an anti-clockwise direction of shift as indicated by the arrows. However, the common factor for each of the loops is that a bit which is shifted 33 times along the loop on which it is located will end up in the corresponding position in the adjacent quadrant. In other words, in 33 steps, the whole array is rotated by 90 degrees.

By allowing the individual specification of data shifts between processing elements, it is possible to transfer data in different directions within the network in one instruction cycle. It must be remembered that in prior SIMD array processors, it was only possible to shift in one direction within the array at any one time because of the constraint of having global shift operations. The providing of a programmable decoder in a SIMD array processor according to the invention for local instruction modification means the data can be shifted in different directions despite the constraint of the global instructions. For the algorithm shown in FIG. 6, the modification data contained in the location accessed in the look-up tables will vary from processor element to processor element to define the loops shown.

The second algorithm concerns a reflection in the X axis.

The second algorithm takes data held in the processor array and reflects it in the "X-axis". For a four by four array of bits the matrix of data before and after rotation will look as indicated below:

| BEFORE | | | | AFTER | | | |
|---|---|---|---|---|---|---|---|
| 1 | 2 | 3 | 4 | 13 | 14 | 15 | 16 |
| 5 | 6 | 7 | 8 | 9 | 10 | 11 | 12 |
| 9 | 10 | 11 | 12 | 5 | 6 | 7 | 8 |
| 13 | 14 | 15 | 16 | 1 | 2 | 3 | 4 |

Figure 7A:
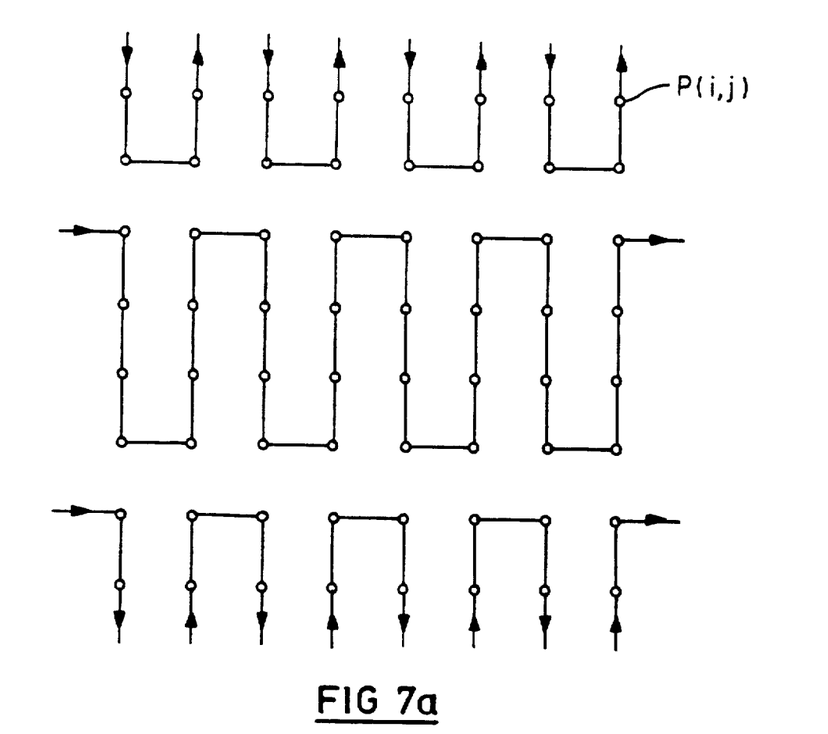
FIGS. 7a and 7b are diagrams illustrating a further algorithm which can be implemented on a SIMD array processor in accordance with the present invention.
Figure 7B:
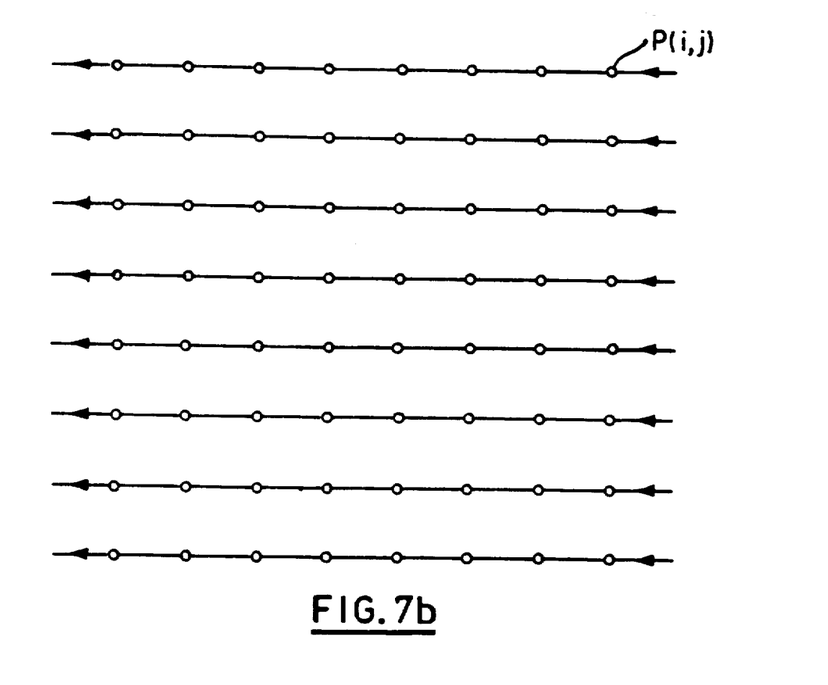

For ease of illustration the algorithm is shown for an 8 by 8 processor array in FIGS. 7a and 7b. It can easily be developed for a 32 by 32 processor array. The algorithm runs in two steps. The first runs for four cycles and has the NEWS setting shown in FIG. 7a. The second step runs in one cycle and is simply a global shift west. This has the NEWS setting shown in FIG. 7b. The algorithm takes $1+n/2$ cycles to implement X-axis reflect on an n by n array (n even).

For the algorithm shown it is only necessary to set the look-up tables once at the beginning of the reflection operation. Four first global shift instructions are issued which are locally modified to give the pattern shown in FIG. 7a which cause any bit to be moved four steps along the path in which it is located. Then a single second global shift instruction (a global shift West) is issued which does not need to be locally modified and gives the NEWS pattern shown in FIG. 7b. This causes any bit to be moved one step Westwards. It can be seen that each bit ends up in a position which forms the reflection in the X axis with respect to its original position. The change in the shift directions of FIG. 7b with respect to FIG. 7a is caused merely by the use of two different global shift instructions. In the case of FIG. 7a the global instruction is modified by modifier bits which vary from processor element to processor element. In the case of FIG. 7b, the global instruction is not modified.

Figure 8:
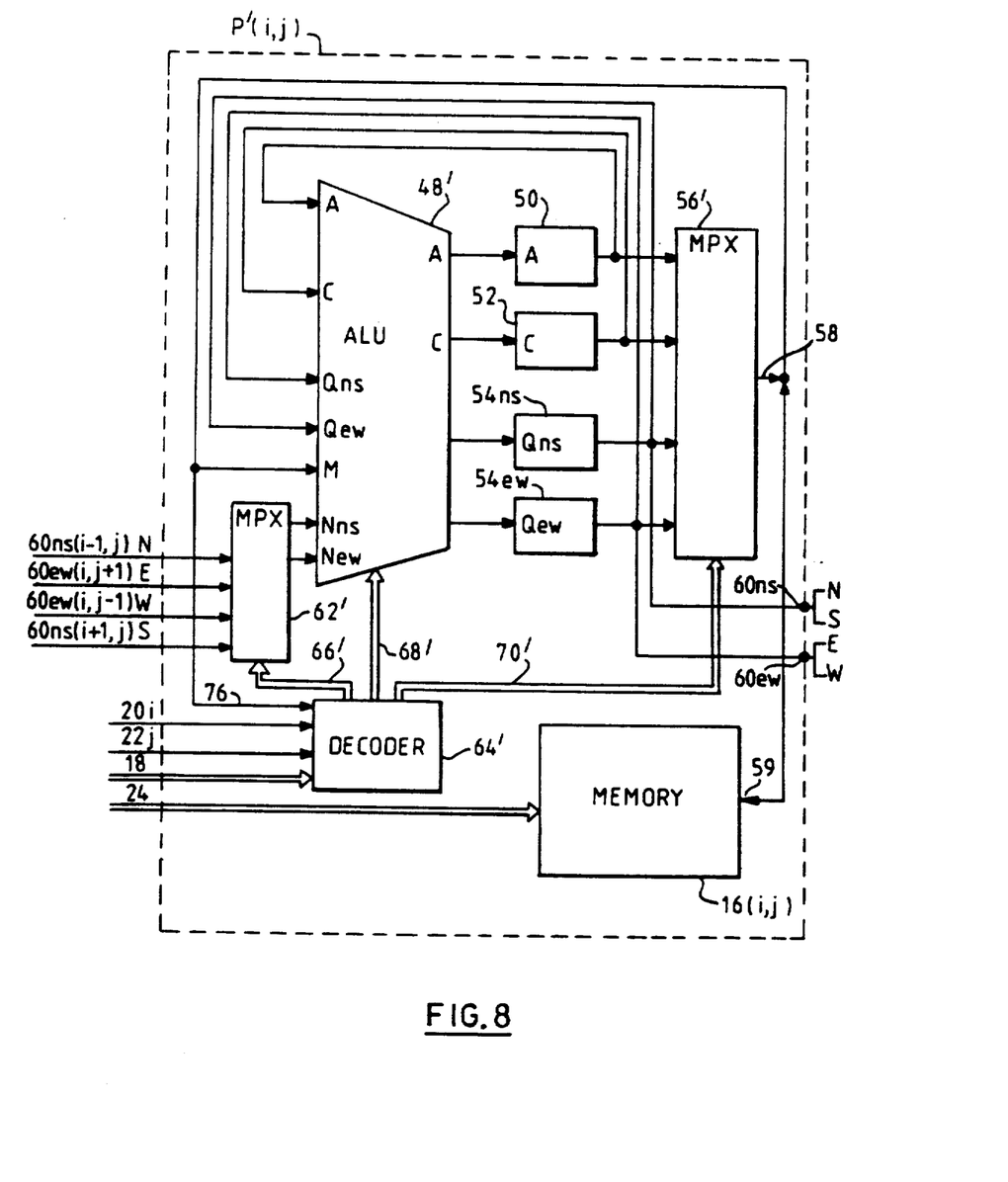
FIG. 8 is a schematic block diagram illustrating modifications to the processing element of FIG. 4.

FIG. 8 illustrates modifications to a processor element which further enhance the flexibility of a SIMD array processor in accordance with the present invention.

In a typical operating cycle in a SIMD array processor a processing element in the array selects data from a single neighbor in the NEWS network. This does not, however, make optimal use of the network connections because only one of the input connections to each cell is used in any one shift cycle. It would appear that 75% of the NEWS connections are idle. In practice however, the NEWS connections are bidirectional, and as one of the "input" connections for a given processing element is in fact used for the output from that element, only 50% of the network is in fact idle. Nevertheless, even this 50% represents an under utilization of the network. The principle modification to the processing elements shown in FIG. 8 is to provide two NEWS output registers Qns 54ns and Qew 54ew. The provision of these two registers provides the basis for allowing shift operations in two directions per cycle e.g. one items North, and one item East. This represents more efficient use of the NEWS wiring. In addition to the above modifications, some additional modifications of the processing elements are necessary.

As shown in FIG. 8, the input multiplexer 62' is a multi-way multiplexer which separately selects two of the NEWS inputs to the processing element P'(i,j) at one time and supplies them to respective inputs Nns and New to the ALU 48'. In addition, a multiplexer function is provided within the ALU 48' to select between the outputs of the Qns and the Qew registers. The Qns register outputs data to the North and South neighbors, and the Qew register passes data to the East and West neighbors. Each of the Q registers may sample data from any of the four NEWS inputs via the input multiplexer 62' and the ALU 48'. A typical cycle might consist of Qns taking data from the West, and Qew taking data from the South. Two such cycles would cause the two sets of data held in the Qns and Qew registers each to move diagonally North-East one position. With only one output register Q, four cycles would be required to achieve these shifts. In this way it is possible for a processing element to shift two bits of data simultaneously.

Further details of the modifications to these components or of the changes to the control lines 66', 68', 70' and to the logic in the decoder 64' need not be given here as they are merely a matter of routine to implement. Also, as will be apparent to the one skilled in the art, other modifications of the processing element are possible which will support the duplication of the Q register.

Although the resulting processing element of FIG. 8 is more complex than that shown in FIG. 4, it does increase further the flexibility and efficiency of the NEWS network. This is achieved, moreover, without additional NEWS connections for each processing element if the input and output lines to processing elements are bidirectional, as the input and output NEWS connections of the processing elements are shared. Also, it is possible for a processing element as shown in FIG. 8 to process two bits of data simultaneously.

In the following, three algorithms which exploit the modifications in FIG. 8 are described with reference to FIGS. 9, 10 and 11. For ease of illustration, the algorithms are shown for an 8 by 8 array only, with each processing element P'(i,j) represented, as before, by a small circle. When interpreting the Figures, it should be remembered that the array is toroidally connected.

Figure 9:
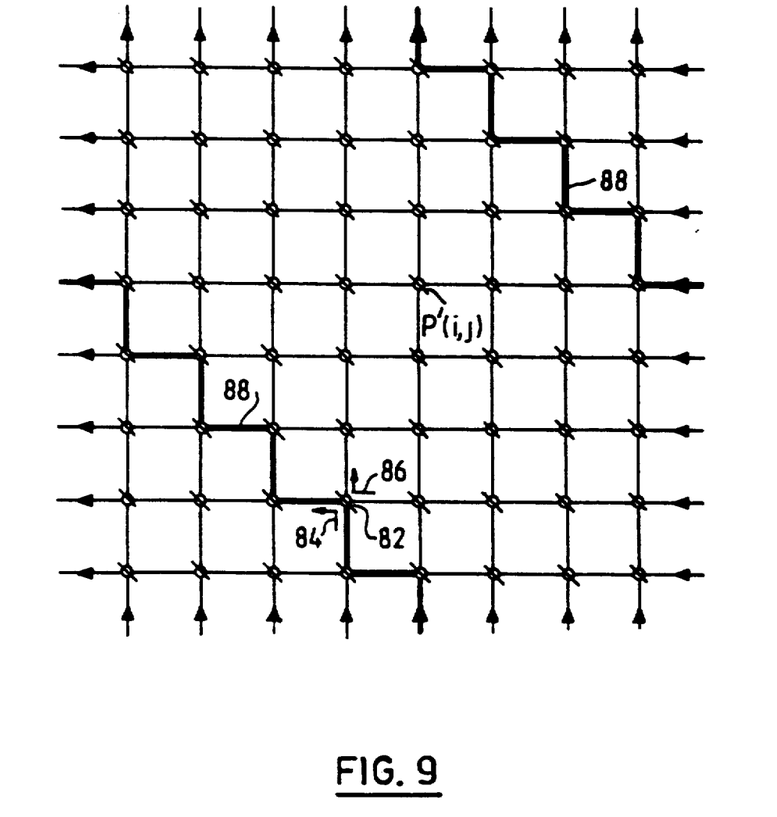
FIGS. 9, 10 and 11 are diagrams illustrating algorithms which can be implemented on a SIMD processor in accordance with the present invention, with the modifications to the processing elements shown in FIG. 8.

The first of these algorithms is illustrated in FIG. 9. This figure represents a North-West shift over the whole array. In FIG. 9 the arrow labelled 86 at the processing element 82 represents the use of the Qns output register 54ns in FIG. 8 for receiving data via the input multiplexer 62' from the Eastern NEWS connection to that processing element. Similarly, the arrow labelled 84 at that processing element in FIG. 9a represents the use of the Qew output register 54ew in FIG. 8 for receiving data from the Southern NEWS connection via the input multiplexer 62' to that processing element. Thus two transfers are being performed in the processing element at that node.

For this algorithm the global shift instruction is decoded in the same way for each of the processors. The obtuse diagonal line through the circles representing the processing elements indicates how the flow of information along different paths is separated. When reading the Figure it is useful to think of the diagonal line as a mirror reflecting the data flow. The thicker lines joining certain processing elements indicate one such path 88. It can be seen how an item of data is shifted in a north-westerly direction in two steps. As each processing element handles two bits at once, only one step per North-West bit shift is required.

Figure 10:
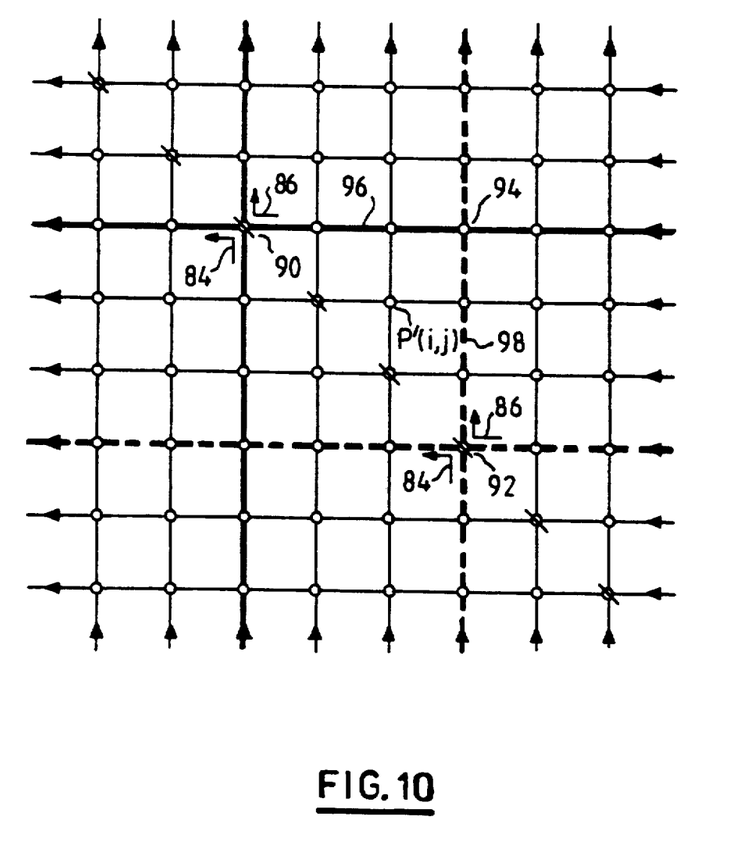

The second algorithm is illustrated in FIG. 10. For this algorithm, which transposes the array, the processing elements are programmed to decode a global shift instruction in two different ways. Processing elements such as the processing elements 90 and 92 which are represented by a circle crossed by an obtuse diagonal line decode a global shift instruction in the same way as the element 82 in FIG. 9, and the data is handled as represented by the arrows 84 and 86. Processing elements such as the element 94, which are represented by a simple circle, are programmed such that data is selected from the South and East NEWS inputs by the input multiplexer 62' and loaded into the Qns and Qew registers respectively.

Two data paths, one 96 represented by heavy lines and one 98 represented by dotted lines are shown, illustrating how the paths change direction at the processing elements shown with a diagonal line and cross over at the other processing elements.

Figure 11:
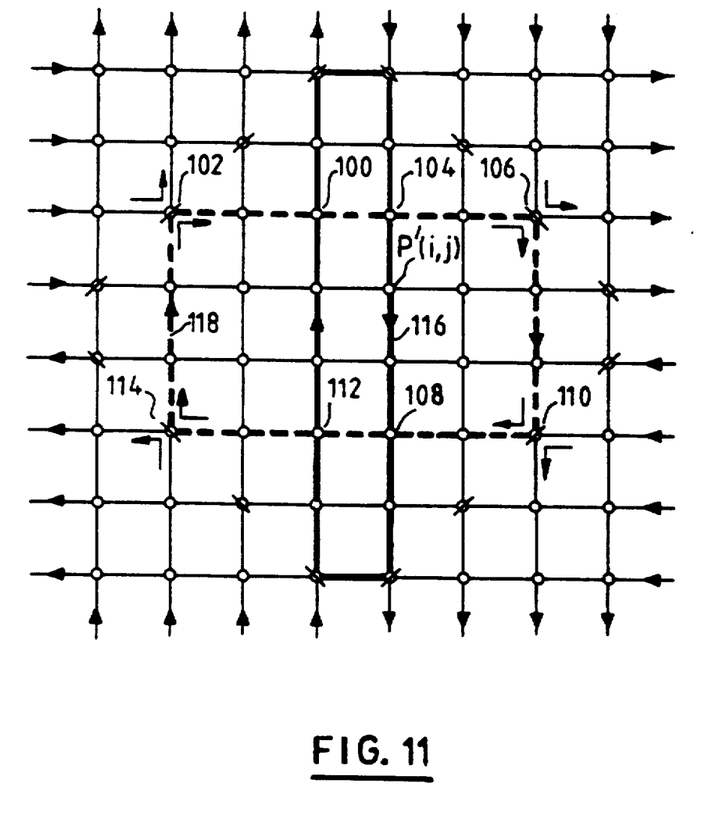

The third algorithm, which performs a rotation by 180 degrees, is illustrated in FIG. 11. As will be apparent on studying this Figure, and in particular the two data paths represented by the heavy line 116 and the dashed line 118, the processing elements are programmed to decode a global shift instruction in two different ways in each quadrant making a total of eight ways in all. These are set out in the following table.

| Quadrant | Processing Element Representation | Data Source For Qns Register | Data Source For Qew Register |
|---|---|---|---|
| NW | Circle (e.g. 100) | South | West |
| NW | Circle and acute diagonal (e.g. 102) | West | South |
| NE | Circle (e.g. 104) | North | West |
| NE | Circle and obtuse diagonal (e.g. 106) | West | North |
| SE | Circle (e.g. 108) | North | East |
| SE | Circle and acute diagonal (e.g. 110) | East | North |
| SW | Circle (e.g. 112) | South | East |
| SW | Circle and obtuse diagonal (e.g. 114) | East | South |

It can be seen from the data paths 116 and 118 that a data bit can be rotated by 180 degrees within the 8 by 8 processor array (e.g. from element 114 to element 106) in eight shifts or steps (i.e. along path 118). As each processing element handles two bits simultaneously, the average number of steps over 180 degree rotation is only four. This algorithm, like the others shown in FIGS. 9 and 10, can easily be generalized to an n by n array where n is even (e.g. a 32 by 32 array).

A specific example of a SIMD array processor in accordance with the present invention with possible modifications thereto has been described herein. It will be apparent to the skilled person however, that many other modifications and alternatives are possible within the scope of the appended claims. For example, although the look-up table is only described for modifying two bits of the instruction code, it will be apparent that a look-up table can be provided for modifying a different number of bits and different types of instructions (i.e. not just shift instructions). In an alternative embodiment, the row and column select lines could also be wired to form part of the input to the look-up table so that the select signals on those lines could also be used for specifying local modifications to the global instruction through the use of the look-up table. The programmable decoder is described herein as comprising a first part in the form of conventional fixed decoder logic such as hard-wired gates and a second, programmable part in the form of a look-up table. It will be apparent to one skilled in the art however, that alternative programmable decoder means, in which part of the array is fixed and part is programmable during processing, can be used instead.

I claim:

1. A SIMD array processor comprising:
    a multidimensional array of processing elements, each said processing element including decoding means for individually decoding a global instruction for local execution in said processing element;
    control logic for issuing said global instruction to said array of processing elements;
    an instruction bus connecting said control logic to each of said processing elements such that said global instructions are received in parallel by each said processing element, said instruction bus comprising a plurality of bus lines;
    said decoding means of at least one of said processing elements comprising;
        programmable modifying means connected to selected bus lines for locally modifying selected bits of said global instruction and outputting locally modified bits onto local bit lines; and
        fixed decoding means connected to said local bit lines for receiving said locally modified bits from said programmable modifying means, said fixed decoding means further connected to said bus lines for receiving unmodified bits of said global instruction;
    storage for receiving control information and/or data, each said processing element being associated with and having access to a respective block of said storage, said programmable modifying means of each said processing element being connected to said respective block of storage for receiving said control data for individually programming each said programmable modifying means;
    means for said control logic to access said storage and store control data for each said programmable modifying means in said respective blocks of storage;
    said fixed decoding means of each said processing element being simultaneously responsive to unmodified bits of a global load instruction on said instruction bus to cause said control data to be loaded from said respective blocks of storage into said programmable modifying means, irrespective of the value of said locally modified bits.

2. A SIMD array processor as claimed in claim 1 wherein said programmable modifying means comprises a look-up table.

3. A SIMD array processor as claimed in claim 2 wherein said look-up table comprises:
    a serial write port connected to said block of storage for receiving modification serially therefrom; and
    a parallel write port connected to said selected bus lines for receiving said selected bits of said global instruction in parallel.

4. A SIMD array processor as in claim 1 wherein said programmable modifying means is connected to said selected bus lines for receiving bits of a global shift instruction which determine a shift direction, said programmable modifying means being responsive to said global shift instruction so as to locally modify said global shift instruction such that data may be distributed throughout the array at any one time in a plurality of directions within the array.

5. A SIMD array processor as claimed in claim 4 wherein said processing elements of said array are interconnected in two orthogonal directions, each processing element in said array having an input multiplexer, a first output register which is connected to the input multiplexer of two logically adjacent said processing elements in a first said orthogonal direction and a second output register which is connected to the input multiplexer of two logically adjacent said processing elements in a second said orthogonal direction whereby multiple simultaneous data shift operations may be performed in a plurality of directions at one time within a said processing element.

6. A display system comprising:
    a host processor including a display device; and
    a SIMD array processor comprising:
        a multidimensional array of processing elements, each said processing element including decoding means for individually decoding a global instruction for local execution in that processing element;
        control logic for issuing said global instruction to said array of processing elements;
        an instruction bus connecting said control logic to each of said processing elements such that said global instructions are received in parallel by each said processing element, said instruction bus comprising a plurality of bus lines;
        said decoding means of at least one of said processing elements comprising:
            programmable modifying means connected to selected bus lines for locally modifying selected bits of said global instruction and outputting locally modified bits onto local bit lines; and
            fixed decoding means connected to said local bit lines for receiving said locally modified bits from said programmable modifying means, said fixed decoding means further connected to said bus lines for receiving unmodified bits of said global instruction;
        storage for receiving control information and/or data, each said processing element being associated with and having access to a respective block of said storage, said programmable modifying means of each said processing element being connected to said respective block of storage for receiving said control data for individually programming each said programmable modifying means;
        means for said control logic to access said storage and store control data for each said programmable modifying means in said respective blocks of storage;
        said fixed decoding means of each said processing element being simultaneously responsive to unmodified bits of a global load instruction on said instruction bus to cause said control data to be loaded from said respective blocks of storage into said programmable modifying means, irrespective of the value of said locally modified bits.

7. A display system as recited in claim 6 wherein said programmable modifying means of said SIMD array processor comprises a look-up table.

8. A display system as recited in claim 7 wherein said look-up table comprises a serial write port connected to said block of storage for receiving modification serially therefrom and a parallel write port connected to said selected bus lines for receiving said selected bits of said global instruction in parallel.

9. A display system as recited in claim 6 in which the programmable modifying means of said SIMD array processor is connected to said selected bus lines for receiving bits of a global shift instruction which determine a shift direction, whereby the programmable modifying means may be programmed to locally modify a global shift instruction such that data may be distributed throughout the array at any one time in a plurality of directions within the array.

10. A display system as claimed in claim 9 wherein said processing elements of said array are interconnected in two orthogonal directions, each processing element in the array comprising an input multiplexer, a first output register which is connected to the input multiplexer of two logically adjacent said processing elements in a first said orthogonal direction and a second output register which is connected to the input multiplexer of two logically adjacent said processing elements in a second said orthogonal direction whereby multiple simultaneous data shift operations may be performed in a plurality of directions at one time within a said processing element.

* * * * *